US009540977B2

(12) United States Patent
Sadaoka et al.

(10) Patent No.: US 9,540,977 B2
(45) Date of Patent: Jan. 10, 2017

(54) PARTICULATE FILTER

(71) Applicant: SUMITOMO CHEMICAL COMPANY, LIMITED, Chuo-ku, Tokyo (JP)

(72) Inventors: Kazuo Sadaoka, Niihama (JP); Masato Sonoda, Niihama (JP); Teruo Komori, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/041,838

(22) Filed: Feb. 11, 2016

(65) Prior Publication Data
US 2016/0160720 A1 Jun. 9, 2016

Related U.S. Application Data

(63) Continuation of application No. PCT/JP2014/071197, filed on Aug. 11, 2014.

(30) Foreign Application Priority Data

Aug. 14, 2013 (JP) .................................. 2013-168582

(51) Int. Cl.
*B01D 39/14* (2006.01)
*B01D 39/20* (2006.01)
(Continued)

(52) U.S. Cl.
CPC ........... *F01N 3/0222* (2013.01); *B01D 46/247* (2013.01); *B01D 46/2474* (2013.01);
(Continued)

(58) Field of Classification Search
CPC ................ C04B 38/0006; F01N 3/0222; F01N 2330/30; F01N 2330/48; B01D 46/247; B01D 46/2474
See application file for complete search history.

(56) References Cited

U.S. PATENT DOCUMENTS 4,519,820 A * 5/1985 Oyobe ............... B01D 46/2407
159/DIG. 10
4,767,309 A * 8/1988 Mizuno .................. B28B 3/269
264/177.11
(Continued)

FOREIGN PATENT DOCUMENTS

JP 2005-118747 A 5/2005
JP 2006-231111 9/2006
(Continued)

OTHER PUBLICATIONS

English Translation of JP2013128913, Iwasaki et al. Jul. 2013, Japan.*
(Continued)

*Primary Examiner* — Amber R Orlando
(74) *Attorney, Agent, or Firm* — Finnegan, Henderson, Farabow, Garrett & Dunner, LLP

(57) ABSTRACT

This particulate filter 200 has a columnar ceramic honeycomb structure 201 including first flow channels 210 and second flow channels 220. Adjacently to each of the first flow channels 210, the second flow channel 220 and the other first flow channel 210 are arranged through a partition wall portion forming each of the first flow channels 210. A sum total of areas of the inner faces of the first flow channels 210 per apparent unit volume of the ceramic honeycomb structure 201 is 1.5 to 2.5 $m^2/L$; a number density of a total of the first flow channels 210 and the second flow channels 220 is 150 to 350 per unit square inch in a cross section perpendicular to an axis of the ceramic honeycomb structure 201; and a hydraulic diameter of each of the first flow channels 210 is 0.5 to 1.0 mm.

6 Claims, 14 Drawing Sheets

(51) Int. Cl.
  *B01D 39/06*   (2006.01)
  *F01N 3/022*   (2006.01)
  *C04B 38/00*   (2006.01)
  *B01D 46/24*   (2006.01)
  *F01N 3/035*   (2006.01)
  *C04B 111/00*   (2006.01)

(52) U.S. Cl.
  CPC .. *C04B 38/0006* (2013.01); *B01D 2046/2496* (2013.01); *C04B 2111/00793* (2013.01); *F01N 3/035* (2013.01); *F01N 2330/06* (2013.01); *F01N 2330/30* (2013.01); *F01N 2330/34* (2013.01); *F01N 2330/48* (2013.01); *Y02T 10/20* (2013.01)

(56) References Cited

U.S. PATENT DOCUMENTS

| | | | | |
|---|---|---|---|---|
| 4,902,216 | A * | 2/1990 | Cunningham | B28B 3/269 264/177.12 |
| 5,171,335 | A * | 12/1992 | Kojima | F01N 3/0211 55/523 |
| 7,384,442 | B2 * | 6/2008 | Bardhan | B01D 39/2093 264/628 |
| 7,556,782 | B2 * | 7/2009 | Ohno | B01D 46/0063 422/180 |
| 8,038,757 | B2 * | 10/2011 | Bardon | F01N 3/0222 55/523 |
| 2003/0044572 | A1 * | 3/2003 | Beall | B01D 39/2068 428/116 |
| 2004/0037998 | A1 * | 2/2004 | Noda | B01D 39/2068 428/116 |
| 2005/0076627 | A1 * | 4/2005 | Itou | B01D 39/2068 55/523 |
| 2006/0168928 | A1 * | 8/2006 | Bardon | B01D 46/2451 55/523 |
| 2006/0188415 | A1 | 8/2006 | Ohno et al. | |
| 2006/0292340 | A1 * | 12/2006 | Ohno | B01D 46/2466 428/116 |
| 2007/0006556 | A1 * | 1/2007 | Bruck | B01D 39/2044 55/282.2 |
| 2008/0070776 | A1 * | 3/2008 | Yamaguchi | B01D 46/2429 502/100 |
| 2008/0115472 | A1 | 5/2008 | Reinsch et al. | |
| 2008/0124517 | A1 * | 5/2008 | Beall | B01D 46/0063 428/118 |
| 2009/0005240 | A1 * | 1/2009 | Noguchi | B01D 46/2429 502/251 |
| 2009/0199546 | A1 * | 8/2009 | Doring | B01D 53/9431 60/297 |
| 2009/0205301 | A1 | 8/2009 | Komori et al. | |
| 2009/0205303 | A1 * | 8/2009 | Ichikawa | B01D 46/244 55/522 |
| 2010/0101196 | A1 | 4/2010 | Carranza et al. | |

FOREIGN PATENT DOCUMENTS

| | | |
|---|---|---|
| JP | 2007-538193 | 12/2007 |
| JP | 2009-537741 | 10/2009 |
| JP | 2010-517743 | 5/2010 |
| JP | 2010-221185 A | 10/2010 |
| JP | 2012254438 * | 12/2012 |
| JP | 2013128913 * | 7/2013 |
| WO | WO 2012/157420 A1 | 11/2012 |
| WO | WO 2012/157421 A1 | 11/2012 |
| WO | WO 2012/157422 A1 | 11/2012 |
| WO | WO 2013/094518 A1 | 6/2013 |

OTHER PUBLICATIONS

English Translation of JP2012254438, Iwasaki et al. Dec. 2012, Japan.*
International Preliminary Report, in corresponding Application No. PCT/JP2014/071197, mailed Feb. 25, 2016, 2 pages.
Written Opinion in corresponding Application No. PCT/JP2014/071197, mailed Nov. 11, 2014, 6 pages.

* cited by examiner

PARTICULATE FILTER

CROSS REFERENCE TO RELATED APPLICATIONS

This application is a continuation application based on PCT/JP2014/071197, filed Aug. 11, 2014, which claims the priority of Japanese Patent Application No. 2013-168582, filed Aug. 14, 2013, the content of each application being incorporated herein by reference.

TECHNICAL FIELD

The present invention relates to a particulate filter.

BACKGROUND ART

A particulate filter such as a diesel particulate filter is used as a ceramic filter for removing a substance to be collected from a fluid containing the substance to be collected, and is used, for instance, as an exhaust gas filter for purifying an exhaust gas which is exhausted from an internal combustion engine such as a diesel engine and a gasoline engine. Such a particulate filter has a large number of inlet-side flow channels and outlet-side flow channels, which are partitioned from each other by a porous partition wall and are parallel to each other (for instance, see following Patent Literature 1).

CITATION LIST

Patent Literature

Patent Literature 1: Japanese Unexamined Patent Publication No. 2009-537741

SUMMARY OF INVENTION

Technical Problem

By the way, as a fluid containing soot is supplied to the particulate filter, the soot gradually accumulates on the surface of the partition wall and the inside of the partition wall of the particulate filter. In this case, when the soot excessively accumulates in the particulate filter, the movement of the fluid in the particulate filter is disturbed, a pressure loss in the particulate filter increases, and a fuel consumption performance is lowered. For this reason, after a certain amount of soot has accumulated in the particulate filter, the soot is removed by being burned, in other words, the so-called regeneration of the filter is performed In the regeneration of the filter, the soot in the central part in the radial direction of the filter easily burns as compared to the soot in an outer periphery. In addition, when there is a large difference between the pressure losses before and after the collection of the soot, there has been a case where after the soot in the central part in the radial direction has burned in advance, the gas selectively flows in the central part in the radial direction, in which there is no soot, it becomes difficult for the gas to flow toward the outer periphery, and it becomes difficult for the soot of the outer periphery to be removed.

The present invention is designed with respect to such a situation, and an object is to provide a particulate filter which can reduce the difference between the pressure losses before and after the collection of the soot.

Solution to Problem

A particulate filter according to the present invention has a columnar ceramic honeycomb structure that forms a plurality of first flow channels extending in an axial direction, each of the first flow channels being opened in one end face and closed in the other end face, and a plurality of second flow channels extending in the axial direction, each of the second flow channels being opened in the other end face and closed in the one end face. Adjacently to each of the first flow channels, the second flow channel and another of the first flow channel are arranged so as to sandwich a partition wall portion forming each of the first flow channels. A sum total S of areas of the inner faces of the plurality of first flow channels in the total volume of the ceramic honeycomb structure is 1.5 to 2.5 $m^2$/L; a number density D of a total of the plurality of first flow channels and the plurality of second flow channels is 150 to 350 per unit square inch in a cross section perpendicular to an axis of the ceramic honeycomb structure; and a hydraulic diameter HD of each of the plurality of first flow channels is 0.5 to 1.0 mm.

According to the present invention, the difference between the pressure losses before and after the collection of the soot can be reduced.

Here, it is preferable that the inner face of at least one of the first flow channels has a plurality of salients extending in the axial direction of the ceramic honeycomb structure.

Thereby, it becomes easy for the ceramic honeycomb structure to satisfy the above described S, D and HD.

At this time, it is preferable that in at least one of the first flow channels, an average height of salients provided on a partition wall portion separating the first flow channel and the second flow channel from each other is larger than an average height of the salients provided on a partition wall portion separating the first flow channel and the first flow channel from each other.

Thereby, it becomes possible to selectively increase the area of the partition wall portion that separates the first flow channel and the second flow channel from each other, in which the gas easily flows, accordingly the amount of catalysts to be carried can be increased, and the catalyst performance can be enhanced.

In addition, when Rw is defined by (sum total of areas of inner faces in the plurality of first flow channels/sum total of areas of inner faces in the plurality of second flow channels), it is preferable that 2≤Rw≤4 is satisfied.

Thereby, also the pressure loss of the filter at the time when the amount of the collected substance is small becomes an appropriate amount, also the increase of the pressure loss caused by the collection of the soot is moderate, and the soot tends to easily burn uniformly at the time of the regeneration.

In addition, when Rs is defined by (sum total of sectional areas of the plurality of first flow channels/sum total of sectional areas of the plurality of second flow channels), it is preferable that 1.1≤Rs≤2.0 is satisfied.

Thereby, a balance between the pressure losses of the first flow channel and the second flow channel becomes adequate, and as a result, the whole of the pressure loss becomes small.

Here, it is preferable that adjacently to each of the first flow channels, three of the second flow channels and other three of the first flow channels are arranged so as to sandwich the partition wall portion forming each of the first flow channels, and that adjacently to each of the second flow channels, six of the first flow channels are arranged so as to sandwich a partition wall portion forming each of the second flow channels.

In addition, it is also preferable that adjacently to each of the first flow channels, two of the second flow channels and other four of the first flow channels are arranged so as to sandwich the partition wall portion forming each of the first flow channels, and that adjacently to each of the second flow channels, six of the first flow channels are arranged so as to sandwich a partition wall portion forming each of the second flow channels.

In addition, it is also preferable that adjacently to each of the first flow channels, four of the second flow channels and other four of the first flow channels are arranged so as to sandwich the partition wall portion forming each of the first flow channels, and that adjacently to each of the second flow channels, four of the first flow channels are arranged so as to sandwich a partition wall portion forming each of the second flow channels.

Thereby, the above described numerical value range can be easily realized.

Advantageous Effects of Invention

According to the particulate filter according to the present invention, the particulate filter is provided which can reduce the difference between the pressure losses before and after the collection of the soot.

DESCRIPTION OF EMBODIMENTS

Figure 1:
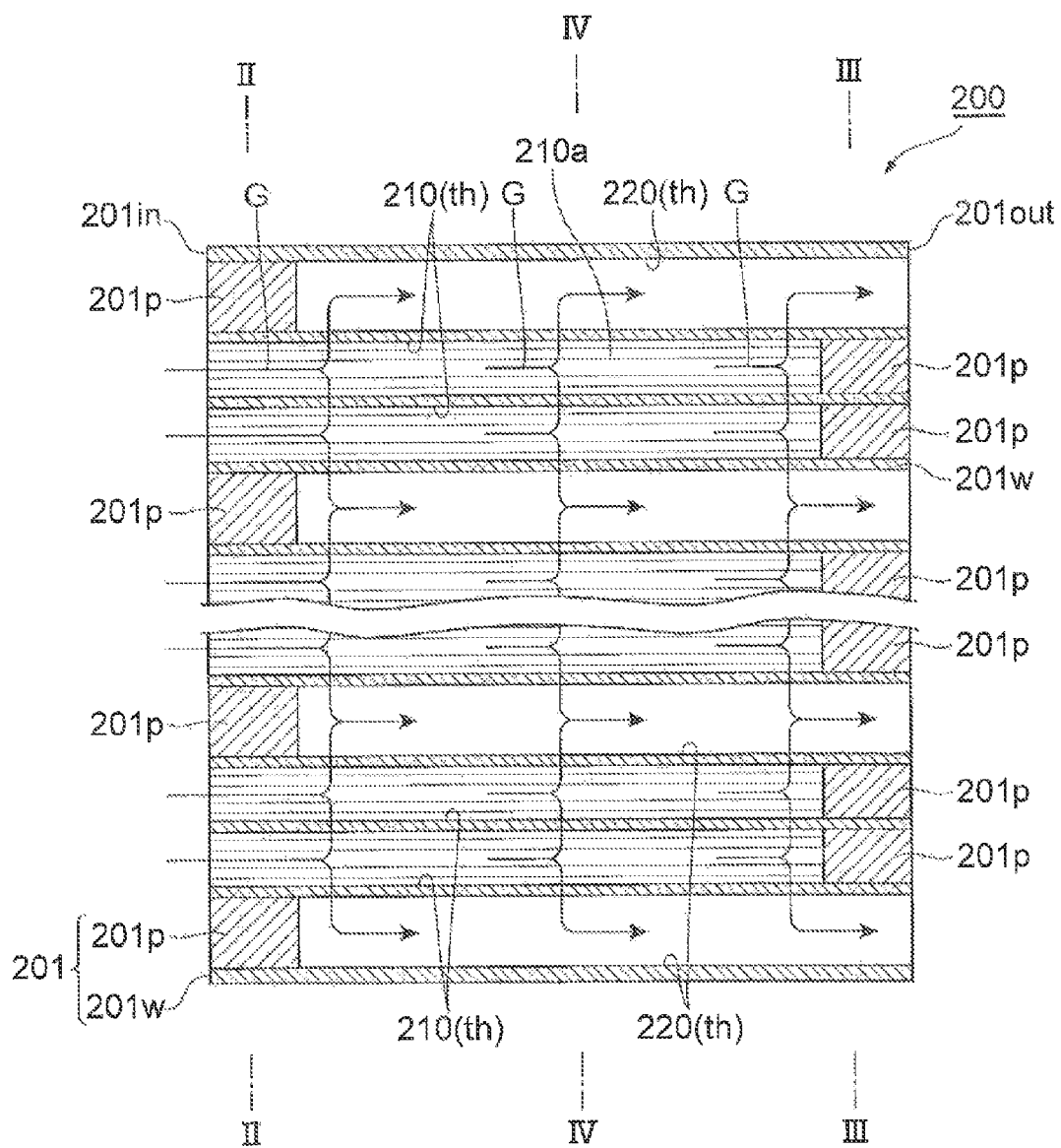
FIG. 1 is a cross-sectional view taken along an axis of a diesel particulate filter according to a first embodiment of the present invention.

The mode for carrying out the present invention will be described below in detail with reference to the drawings as needed. However, the present invention is not limited to the following embodiments. Incidentally, in the drawings, the same reference numerals shall be put on the same elements, and overlapping descriptions are omitted. In addition, dimensional ratios in the drawings are not limited to the ratios shown in the drawings.

First Embodiment

Figure 2:
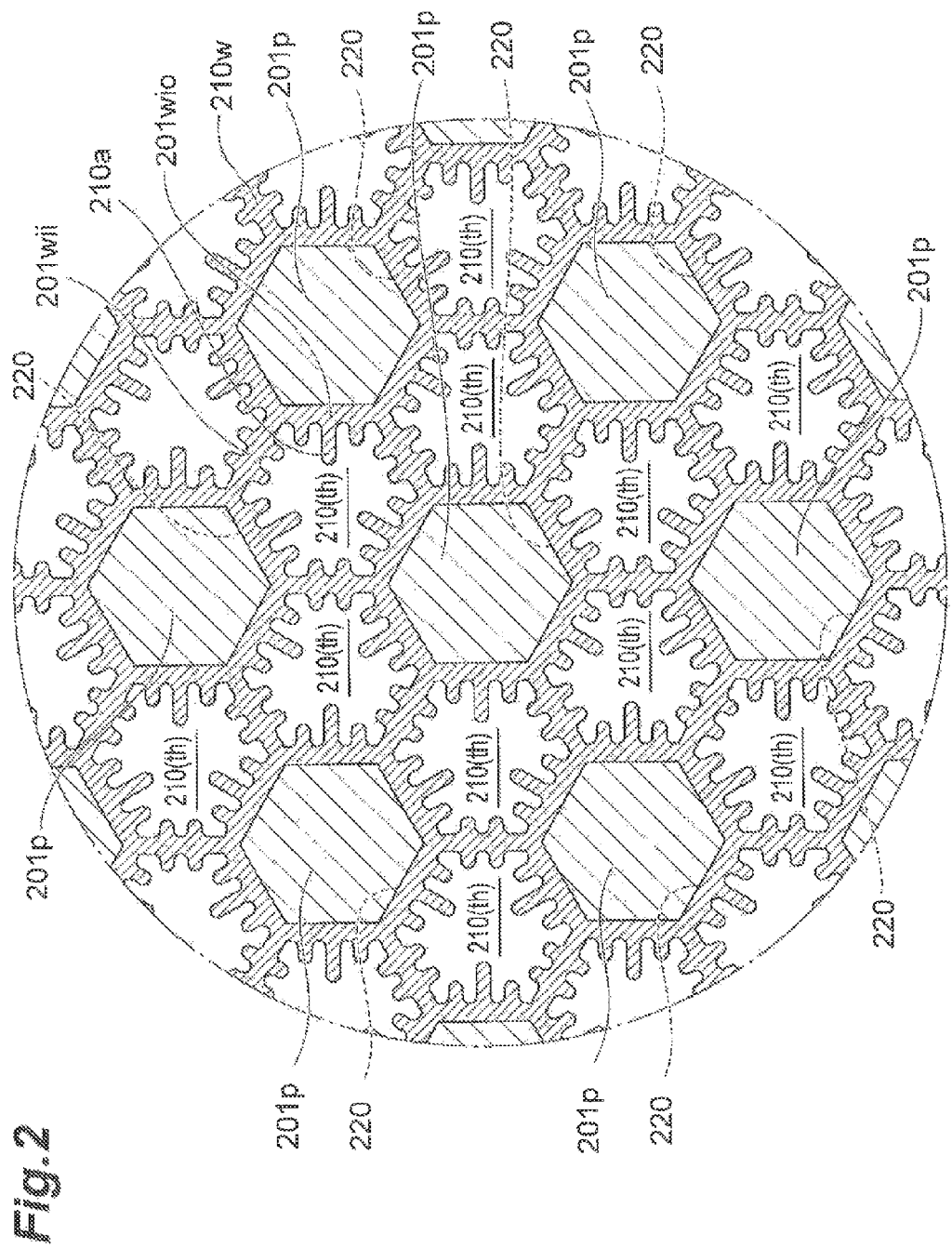
FIG. 2 is an end view along II-II of FIG. 1.
Figure 3:
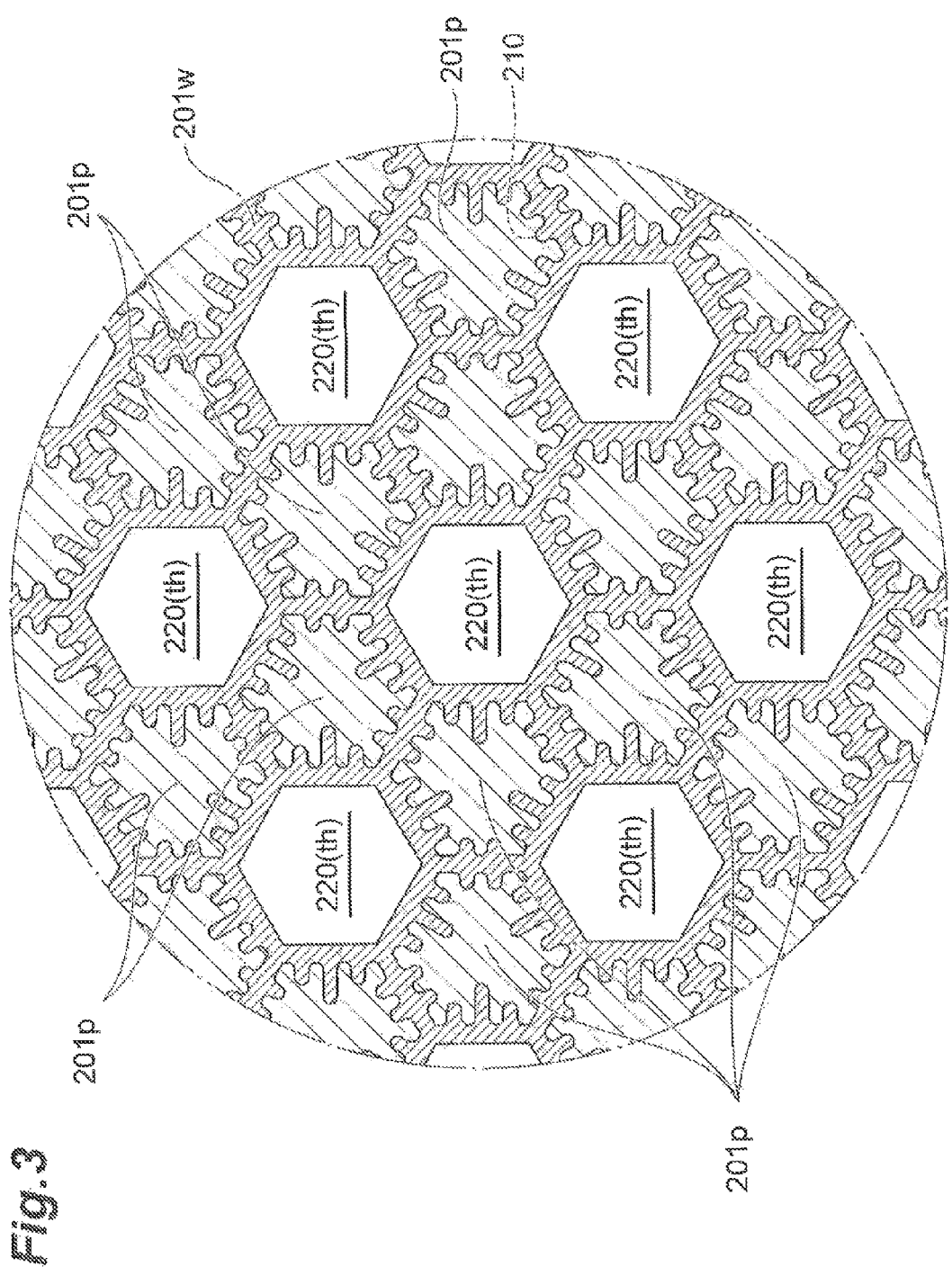
FIG. 3 is an end view along III-III of FIG. 1.
Figure 4:
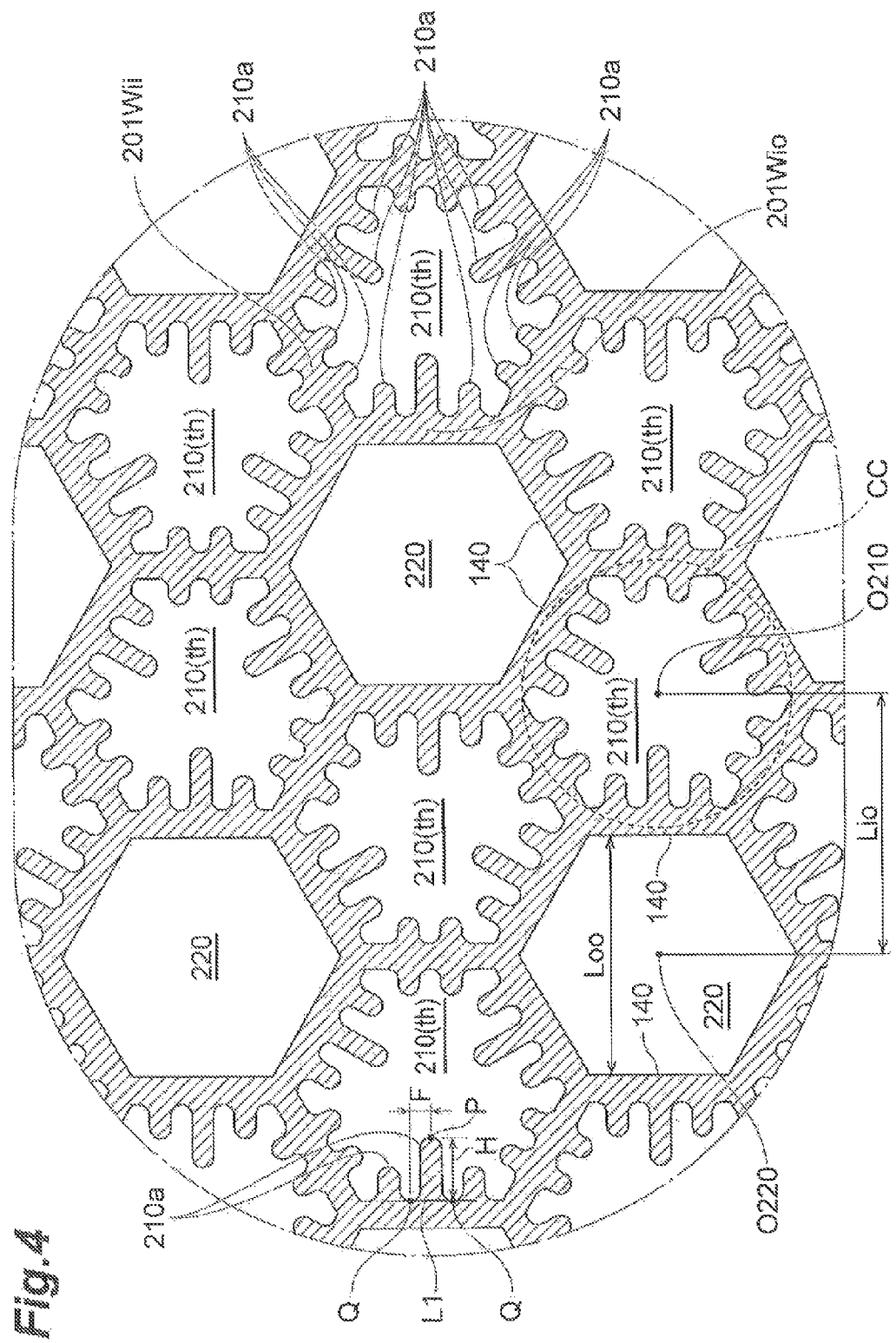
FIG. 4 is a cross-sectional view taken along IV-IV of FIG. 1.

FIG. 1 is a cross-sectional view taken along an axis of a diesel particulate filter 200 according to a first embodiment, and FIG. 2 to FIG. 4 are enlarged views of an inlet-side end face 201in, an outlet-side end face 201out and a cross-section of the central part in an axial direction, respectively, of the diesel particulate filter 200 of FIG. 1.

As illustrated in FIG. 1, the diesel particulate filter 200 has a columnar ceramic honeycomb structure 201 which has the inlet-side end face (one end face) 201in and the outlet-side end face (the other end face) 201out. The ceramic honeycomb structure 201 has porous ceramic partition walls 201w which form many through holes th that extend in the axial direction, in other words, between the inlet-side end faces 201in and the outlet-side end faces 201out, and are provided approximately in parallel to each other, and closing portions (plugging parts) 201a which close any one end of each of the through holes th. As illustrated in FIG. 1 to FIG. 3, the outlet-side end faces 201out of one part of the through holes th are closed by closing portions 201p, and thereby a plurality of inlet-side flow channels (first flow channel) 210 are formed which are opened in the inlet-side end faces 201in and are closed in the outlet-side end faces 201out. In addition, the inlet-side end faces 201 in of the remaining through holes th are closed by the closing portions 201p, and thereby a plurality of outlet-side flow channels (second flow channel) 220 are formed which are opened in the outlet-side end faces 201out and are opened in the inlet-side end faces 201in.

In the present embodiment, as illustrated in FIG. 4, adjacently to each of the inlet-side flow channels 210, three of other inlet-side flow channels 210 are arranged so as to sandwich the partition wall portion forming each of the inlet-side flow channels 210, and three of the outlet-side flow channels 220 are arranged so as to sandwich the partition wall portion forming each of the inlet-side flow channels 210. On the other hand, adjacently to each of the outlet-side flow channels 220, six of the inlet-side flow channels 210 are arranged so as to sandwich the partition wall forming each of the outlet-side flow channels 220. Adjacently to the outlet-side flow channel, other outlet-side flow channels 220 are not arranged so as to sandwich the partition wall portion forming the outlet-side flow channel 220.

The length in the axial direction of the diesel particulate filter 200 is, for instance, 50 to 300 mm. The outer diameter of the diesel particulate filter 200 is, for instance, 50 to 250 mm.

As illustrated in FIG. 4, a cross-section approximately perpendicular to the axial direction (longitudinal direction) of the outlet-side flow channel 220 is a hexagonal shape. The cross-sectional shape of the outlet-side flow channel 220 is preferably a regular hexagonal shape in which the lengths of the six sides 140 are approximately equal to each other, from a viewpoint that the pressure loss at the time when the substance to be collected has accumulated tends to be easily reduced, because the fluid containing the substance to be collected tends to easily flow uniformly from six of inlet-side flow channels 210 to one outlet-side flow channel 220, but may be a hexagon in which the lengths of the sides are different from each other, and/or in which the angles are not 60°.

In the present embodiment, as illustrated in FIG. 1 and FIG. 4, an inner face of the inlet-side flow channel 210 has many salients 210a extending in the axial direction of the inlet-side flow channel 210. As illustrated in FIG. 4, in the present embodiment, a plurality of salients 210a are provided on a partition wall portion 201wio separating the inlet-side flow channel 210 from the outlet-side flow channel 220, and a plurality of salients 210a are provided also in the partition wall portion 201wii separating the inlet-side flow channel 210 from another inlet-side flow channel 210. The height of each of the salients 210a is particularly set so that an average height Hio of salients 210a provided in the partition wall portion 201wio becomes higher than the average height Hii of salients 210a provided in the partition wall portion 201wii. In addition, three salients 210a are provided in each of the partition wall portions 201wio, and the height of salient 210a in the center of the three salients is higher than those of the other two salients 210a.

Here, the height H of the salient 210a can be determined as a distance between a straight line L1 and a point P, at the time when the straight line L1 is drawn which circumscribes two troughs in both sides of the salient 210a, and when the point P is obtained which is most distant from the straight line L1 in the salient 210a. In addition, when both points Q which come in contact with the straight line L1 in two troughs of both sides of the salient 210a do not belong to the partition wall portion 201wio or the partition wall portion 201wii, in other words, when the two points Q exist in a different partition wall portion from each other, the salients may be excluded from the calculation of the average height. All the heights of the salients 210a which exist in each of the partition wall portions do not need to be equal, but a height of one part of the salients 210a may be higher than those of the other salients 210a so as to increase the area of the partition wall (area of inner face of inlet flow channel) and/or to promote heat radiation at the time of a combustion reaction.

Incidentally, the height of each of the salients 210a is not limited in particular, but can be set at 0.05 to 0.6 mm. If the height is less than 0.05 mm, there is a case where the productivity becomes low and the effect becomes low. In addition, when the height exceeds 0.6 mm, there is a case where the productivity decreases.

In addition, the above described difference (Hio−Hii) between the average heights of the salients 210a is not also limited in particular, but can be set at 0.05 to 0.5 mm. If the height is less than 0.05 mm, there is a case where the productivity becomes low and the effect becomes low. In addition, when the height exceeds 0.5 mm, there is a case where the productivity decreases.

A space between the salients 210a is not limited in particular, but it is preferable that a distance F between the point P that is the top of the salient and a point Q that is the bottom of a recess part is 0.08 to 0.4 mm, which has been measured along the straight line L.

In the present embodiment, the sum total S of the areas of the inner faces in the inlet-side flow channels 210 in the total volume of the ceramic honeycomb structure is 1.5 to 2.5 m$^2$/L, the number density (cell density) D of the total of the inlet-side flow channels 210 and the outlet-side flow channels 220 is 150 to 350 per unit square inch in a cross section perpendicular to the axis of the ceramic honeycomb structure 201; and a hydraulic diameter HD of the inlet-side flow channel 210 is 0.5 to 1.0 mm. Incidentally, the unit of the number density D is described as cpsi as well.

Here, the area of the inner face of the inlet-side flow channel 210 can be determined, for instance, from a calculation of multiplying a length LL of a contour of the cross section perpendicular to the axis of the inlet-side flow channel 210 with a length in the axial direction of the inlet-side flow channel 210. The total volume of the ceramic honeycomb structure is an apparent volume which includes a space of the flow channel, the partition wall and the closing portion.

In addition, the hydraulic diameter HD is defined as 4A/LL, when the A represents a cross-sectional area of the flow channel, and the LL represents the above described length of the contour. The cell density D of 150 to 350 cpsi corresponds to 23 to 54 per unit square centimeter. The height of each of the salients, the space, the cross sectional area A of the flow channel and the length LL of the contour of the cross section can be measured by a general image analysis.

If the S exceeds the above described range, the pressure loss of the filter at the time when the amount of the collected soot is small tends to become excessively large; and if the S is less than the above described range, the pressure loss rapidly becomes large as the soot is collected, and after the soot of the central part in the radial direction has selectively burned at the time of the regeneration, it becomes difficult for the soot of the outer periphery to burn. If the S is within the above described range, the pressure loss of the filter at the time when the amount of the collected substance is small becomes an appropriate amount, also the increase of the pressure loss caused by the collection of the soot is moderate, and it is difficult for the soot to ununiformly burn at the time of the regeneration.

If the D exceeds the above described range, a problem occurs which is similar to that in the case where the S exceeds the above described range of the S, and besides also the production is difficult. In addition, if the D is less than the above described range, a problem occurs which is similar to that in the case where the S is less than the above described range of the S.

If the HD exceeds the above described range, a problem occurs which is similar to that in the case where the S exceeds the above described range. If the HD is less than the above described range, the soot, ash and the like tend to easily clog in the vicinity of the inlet.

In addition, in the present embodiment, when Rw is defined by (sum total of areas of inner faces in inlet-side flow channels 210/sum total of areas of inner faces in outlet-side flow channels 220), it is preferable that satisfies 2≤Rw≤4 is satisfied. If the Rw exceeds the above described range, the pressure loss of the filter at the time when the amount of the collected soot is small tends to become excessively large; and if the Rw is less than 2, the pressure loss rapidly becomes large as the soot is collected, and after the soot of the central part in the radial direction has selectively burned at the time of the regeneration, it becomes difficult for the soot of the outer periphery to burn. If the Rw is within the above described range, the pressure loss of the filter at the time when the amount of the collected substance is small becomes an appropriate amount, also the increase of the pressure loss caused by the collection of the soot is moderate, and the soot tends to easily burn uniformly at the time of the regeneration.

In addition, in the present embodiment, when Rs is defined by (sum total of sectional areas of the plurality of inlet-side flow channels/sum total of sectional areas of the plurality of outlet-side flow channels), it is preferable that 1.1≤Rs≤2.0 is satisfied. If the Rs deviates from the above described range, the difference between the pressure loss of the first flow channel and the pressure loss of the second flow channel becomes large, and as a result, the whole of the pressure loss becomes large.

The thickness (cell wall thickness) of a porous ceramic partition wall 201w is not limited in particular as long as the thickness is in such a range as to satisfy the above described S, D and HD, but is preferably 0.6 mm or less and more preferably is 0.4 mm or less in the minimum thickness part, from the viewpoint of the reduction of the pressure loss. The thickness of the porous ceramic partition wall 201w is preferably 0.1 mm or more and more preferably is 0.2 mm or more even in the minimum thickness part, from the viewpoint of maintaining high collection efficiency of the substance to be collected and a high strength of the diesel particulate filter 200.

As illustrated in FIG. 4, a distance Lio between the inlet-side flow channel 210 and the outlet-side flow channel 220, specifically, the distance Lio between the center O210 of a circumscribed circle CC of the inlet-side flow channel 210 and the center O220 (center of circumscribed circle) of the outlet-side flow channel 220 is not limited in particular, but is preferably set at 1.0 to 2.5 mm, from the viewpoint of satisfying the above described S, D and HD. In addition, a distance Loo between a pair of facing sides 140 in the outlet-side flow channel 220 is not limited in particular, but ordinarily can be set at 0.5 to 2.5 mm.

The porosity of the porous ceramic partition wall 201w is preferably 30 volume % or more, more preferably is 40 volume % or more and further preferably is 50 volume % or more, from the viewpoint of reducing the pressure loss. The porosity of the porous ceramic partition wall 201w is preferably 80 volume % or less and more preferably is 70 volume % or less, from the viewpoint of reducing a thermal stress which is generated in the diesel particulate filter in the burning regeneration. The porosity of the porous ceramic partition wall 201w can be adjusted by a particle diameter of the raw material, the amount of a hole-forming agent to be added, a type of the hole-forming agent and burning conditions, and can be measured by a mercury penetration method.

The pore size (pore diameter) of the porous ceramic partition wall 201w is preferably 5 μm or more, and more preferably is 10 μm or more, from the viewpoint of further reducing the pressure loss. The pore size of the porous ceramic partition wall 201w is preferably 30 μm or less, and more preferably is 25 μm or less, from the viewpoint of enhancing the performance of soot collection. The pore size of the porous ceramic partition wall 201w can be adjusted by a particle diameter of the raw material, the amount of a hole-forming agent to be added, a type of the hole-forming agent and burning conditions, and can be measured by a mercury penetration method.

The porous ceramic partition wall can be a sintered body of porous ceramics. A fluid (for instance, exhaust gas containing fine particles such as soot) can permeate the porous ceramic partition wall. Specifically, a large number of communicating pores (passing channels) through which the fluid can pass are formed in the partition wall. Accordingly, in FIG. 1, a gas G which has flowed in from the inlet-side flow channel 210 passes through the porous ceramic partition wall 201w, and is discharged from the outlet-side flow channel 220; and at this time, the soot and the like in the gas are collected by the filter.

The porous ceramic partition wall 201w preferably contains aluminum titanate as a main component, and may further contain alkaline earth metals such as magnesium, and/or alkali metals such as silicon and sodium. The porous ceramic partition wall is formed from, for instance, porous ceramics which are mainly formed of aluminum titanate-based crystals. The phrase "which are mainly formed of aluminum titanate-based crystals" means that a main crystal phase which constitutes the sintered body of aluminum titanate-based ceramics is an aluminum titanate-based crystal phase, and the aluminum titanate-based crystal phase may be, for instance, the aluminum titanate crystal phase, the aluminum magnesium titanate crystal phase or the like.

When the porous ceramic partition wall contains magnesium, a composition formula of the partition wall is, for instance, $Al_{2(1-x)}Mg_xTi_{(1+y)}O_5$, where the value of x satisfies $0<x<1$, preferably satisfies $0.03 \leq x \leq 0.5$ and more preferably satisfies $0.05 \leq x \leq 0.2$. The above described y satisfies $0.5x<y<3x$, preferably satisfies $0.5x<y<2x$, and more preferably satisfies $0.7x<y<2x$. The partition wall can contain trace components originating in the raw materials or trace components which are unavoidably contained in a production process.

When the porous ceramic partition wall contains silicon, the partition wall may contain a glass phase originating in a powder of a silicon source. The glass phase refers to an amorphous phase which contains $SiO_2$ as a major component. In this case, the content of the glass phase is preferably 4 mass % or less. When the content of the glass phase is 4 mass % or less, such a sintered body of the aluminum titanate-based ceramics becomes easily obtained as to satisfy the pore characteristics which are required to a ceramic filter such as the particulate filter. The content of the glass phase is preferably 2 mass % or more.

The porous ceramic partition wall may contain other phases (crystal phases) than the aluminum titanate-based crystal phase and the glass phase. The other phases than the aluminum titanate-based crystal phase can include phases originating in the raw materials which are used in the production of the sintered body of the aluminum titanate-based ceramic. More specifically, the phases originating in the raw materials are phases originating in a powder of an aluminum source, a powder of a titanium source and/or a powder of a magnesium source, which have remained without forming the aluminum titanate-based crystal phase in the production of the diesel particulate filter. The phases originating in the raw materials include phases of alumina and titania. The crystal phase forming the porous ceramic partition wall can be confirmed with an X-ray diffraction spectrum.

The above described diesel particulate filter is suitable as a particulate filter that collects the substance to be collected such as the soot contained in the exhaust gas which has been exhausted from internal combustion engines, for instance, such as a diesel engine and a gasoline engine. For instance, in the diesel particulate filter 200, as illustrated in FIG. 1, the gas G which has been supplied to the inlet-side flow channel 210 from an inlet-side end face 201in passes through the communicating hole in the partition wall, reaches the adjacent outlet-side flow channel 220, and is discharged from the outlet-side end face 201out. At this time, the substance to be collected in the gas G is collected by the surface of the inlet-side flow channel 210 and the inside of the communicating hole, and is removed from the gas G; and thereby the diesel particulate filter 200 functions as a filter.

According to the diesel particulate filter according to the present embodiment, the difference between the pressure losses at the times before and after the soot accumulates can be small. Accordingly, the gas can flow through the outer periphery in the radial direction even if the soot of the central part in the radial direction of the filter burns in advance, as compared to the soot of the outer periphery, it is easy to remove the soot of the outer periphery by burning. Accordingly, it becomes easy to burn the soot uniformly at the time of the regeneration.

Incidentally, the porous ceramic partition wall 201w may carry a catalyst component on the surface and/or in the inside of the pore. The particulate filter according to the present embodiment can increase the amount of the catalyst to be carried thereon rather than an ordinary filter, and can further enhance the effect due to the catalytic reaction. The examples of the catalyst component include an SCR catalyst, a gas oxidation catalyst and a carbon-burning catalyst.

For instance, the examples of the SCR catalysts are a porous zeolite, a phosphate-based porous material, alumina which carries a noble metal thereon, an oxide containing titanium, an oxide containing zirconium, an oxide containing cerium, and an oxide containing zirconium and cerium. These examples can be used solely or in combination with one or more other examples. At least one of metallic elements selected from the group consisting of titanium, vanadium, chromium, manganese, iron, cobalt, nickel, copper, niobium, rhodium, palladium, silver and platinum may be further carried on zeolite of the SCR catalyst. If the zeolite is a metal-ion-exchange zeolite in which ions in zeolite are exchanged with ions of the above described metallic elements, the reducibility of $NO_X$ enhances. The metal-ion-exchange zeolite is a zeolite in which cations such as sodium ions that zeolite contains have been replaced by other metal ions. Because an effect of enhancing the reducibility of $NO_X$ becomes large, the above described metallic element is preferably at least one of elements which are selected from the group consisting of copper, iron, vanadium, cobalt, nickel and silver, and is particularly preferably copper. Examples of structures of zeolite and similar substances to zeolite include types of MFI, BEA, MOR, FER, CHA, ERI, AEX, LTA, FAU and MWW, which International Zeolite Association defines. When the zeolite or the similar substances to zeolite are used for SCR, structures including the types of MFI, CHA and AEI are preferable among the above examples; MFI includes ZSM-5; AEI includes SSZ-39, AlPO-18 and SAPO-18; and CHA includes SSZ-13, AlPO-34 and SAPO-34. In addition, when the zeolite or the similar substances to zeolite are used for adsorbing hydrocarbons, types of MFI, BEA, MOR, FER and FAU are preferable from the viewpoint of the amount of HC to be adsorbed; and the representative examples of the types include ZSM-5, β-zeolite, mordenite, ferrierite and USY zeolite.

When the component of a catalyst contains zeolite, a molar ratio (silica/alumina) of silica ($SiO_2$) to alumina ($Al_2O_3$) in the zeolite is preferably 5 to 10000, and more preferably is 10 to 5000, from the viewpoint that the zeolite obtains an excellent reducing efficiency for $NO_X$.

By making the surface of the partition wall of the diesel particulate filter carry the above described component of the SCR catalyst, the diesel particulate filter can be provided which has also a function of SCR (Selective Catalytic Reduction). Specifically, the diesel particulate filter can reduce $NO_x$ in the gas by the addition of ammonia sources and the like such as urea water.

In addition, the gas oxidation catalyst is also referred to as DOC (Diesel Oxidation Catalyst) catalyst, and is a noble metal catalyst of, for instance, platinum, palladium or the like. Such a noble metal catalyst can oxidize and remove most of hydrocarbons (hydrocarbon), carbon monoxide and the like which are contained in the gas. In addition, the diesel particulate filter can also carry zeolite thereon in addition to the above described noble metal catalyst, for the purpose of adsorbing and burning the hydrocarbons which have not been completely oxidized by the oxidation catalyst that is installed in a pre-stage of the diesel particulate filter in an exhaust-gas line.

In addition, an example of the carbon-burning catalyst is the noble metal catalyst carried on a γ-alumina catalyst. The carbon-burning catalyst can promote the burning of collected carbon particles and the like.

Such a diesel particulate filter which has the catalyst carried thereon is referred to as a catalyzed diesel particulate filter (Catalyzed Diesel Particulate Filter).

The diesel particulate filter according to the present embodiment has a large area of the inner face of the inlet-side flow channel 210 in the total volume of the filter, as compared to a past filter, accordingly can increase an amount of the catalyst to be carried per apparent unit volume of the filter, without increasing a thickness of the catalyst layer so much, and can enhance an effect of the catalyst.

In addition, when the salients 210a exist, the amount of the catalyst to be carried easily becomes ununiform between the peak and the trough of the salient, specifically, the inner face of the inlet-side flow channel 210 is ununiformly covered with the catalyst layer, and the rise of the pressure loss can be reduced which is caused by the carried catalyst.

In addition, though the carbon-burning catalyst needs to reach a certain level of temperature so that the carbon-burning catalyst functions at the time of the filter regeneration, the top of the salient 210a reaches the temperature earlier than that of the case where there is no salient, when accumulating soot burns, and accordingly the time period is shortened which is spent by the time when the function of the carbon-burning catalyst is exhibited.

Second Embodiment

Figure 5:
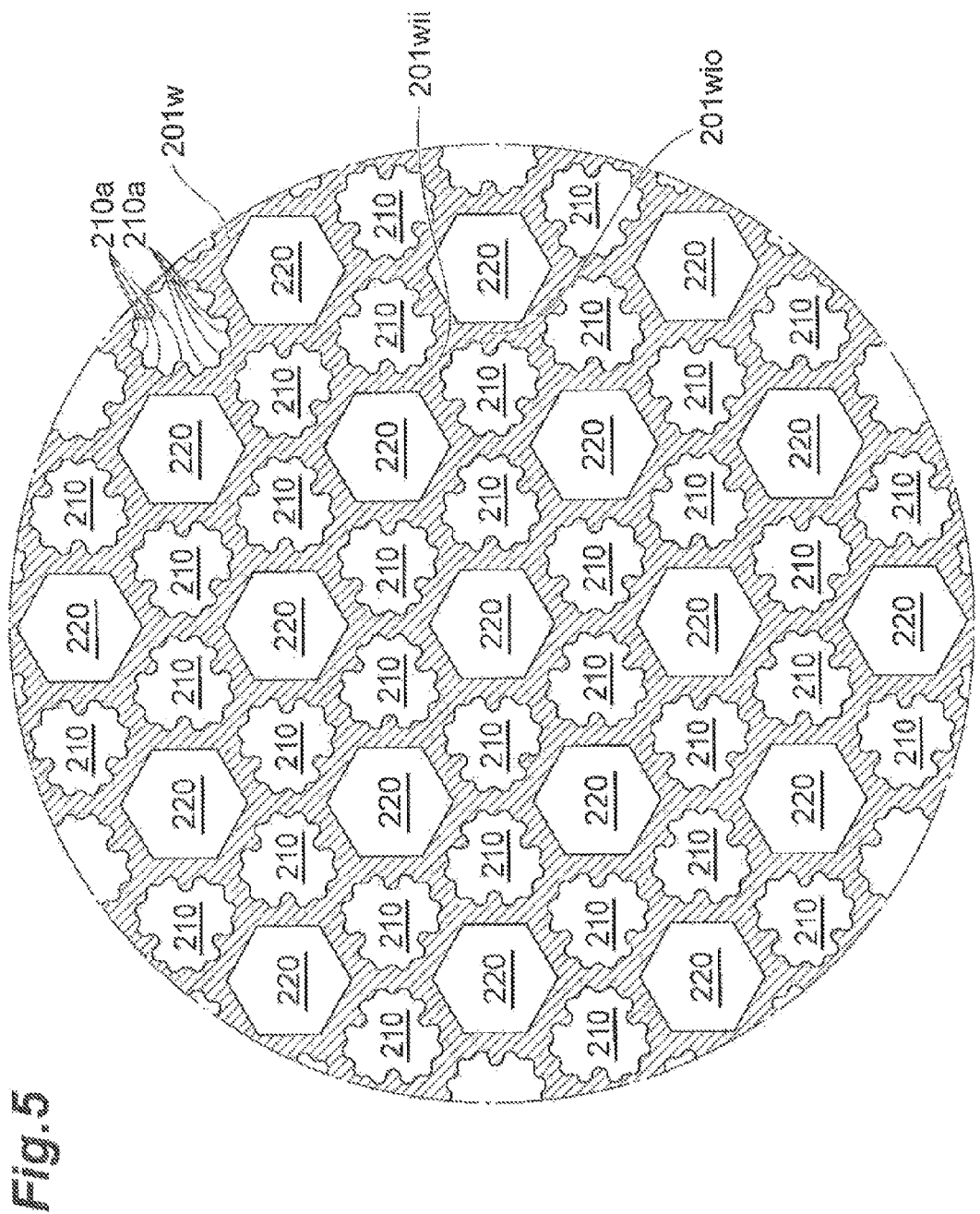
FIG. 5 is a vertical sectional view of a diesel particulate filter according to a second embodiment of the present invention.

FIG. 5 is a cross-sectional view of a central part in an axial direction of a diesel particulate filter according to a second embodiment. The point at which the diesel particulate filter of the present embodiment is different from that in the first embodiment is a point that the cell density D is relatively enhanced, and that the sum total S of the area of the inner face of the inlet-side flow channel 210 is relatively reduced and a hydraulic diameter HD of the inlet-side flow channel is relatively increased, so as to satisfy the ranges of the sum total S of the area of the inner face of the inlet-side flow channel 210, the cell density D and the hydraulic diameter HD of the inlet-side flow channel, which have been shown in the first embodiment. In addition, the number of the salients 210a in the inlet-side flow channel 210 also becomes less, and the heights also become relatively small. Specifically, one salient 210a is formed on each of the partition wall portions 201wio, one salient 210a is formed on each of the partition wall portions 201wii, and one salient 210a is formed so as to stride from the partition wall portion 201wii to the partition wall portion 201wio. Also in the present embodiment, an average height Hio of the salients 210a provided on the partition wall portion 201wio is higher than an average height Hii of the salients 210a provided on the partition wall portion 201wii.

Third Embodiment

Figure 6:
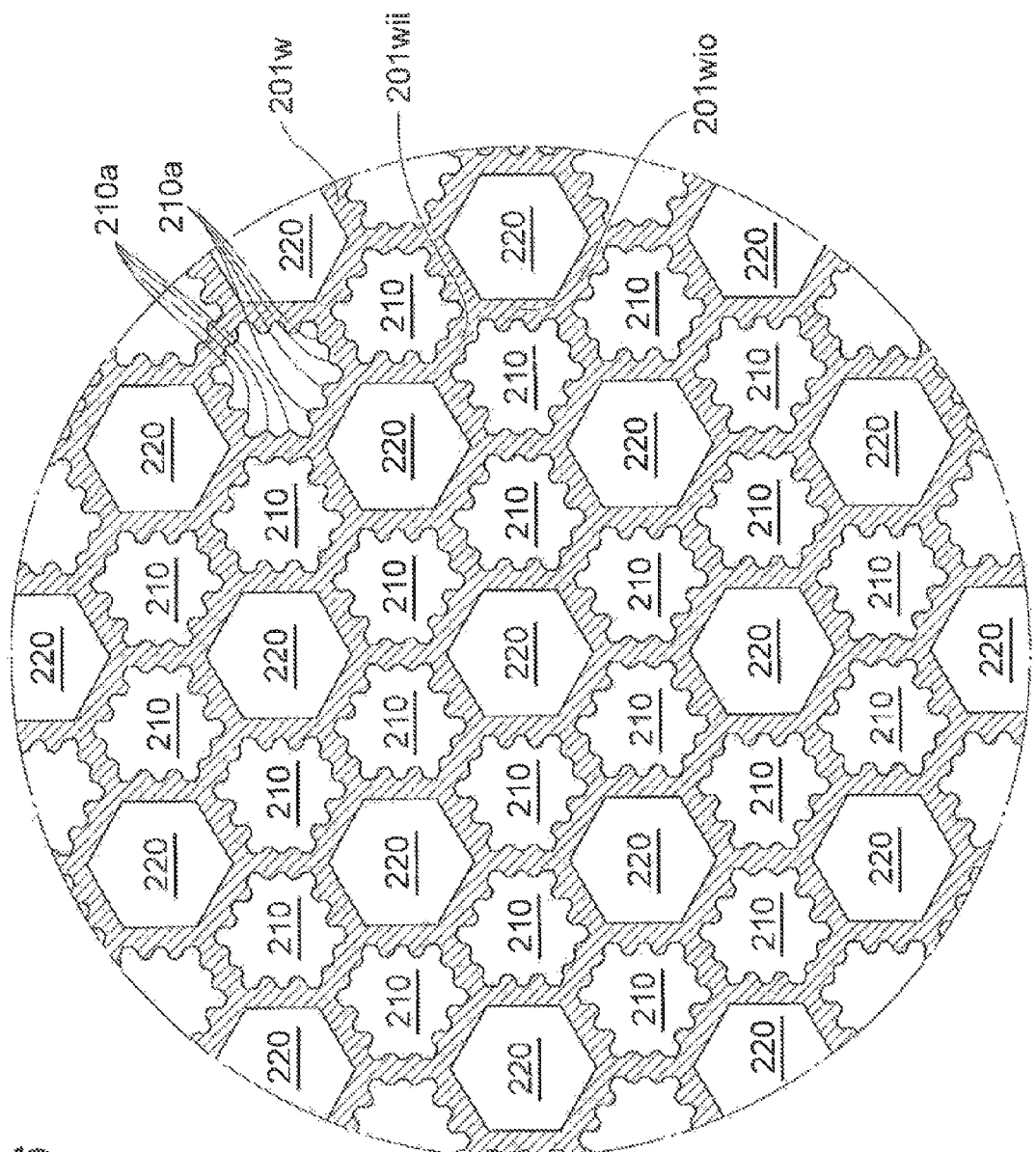
FIG. 6 is a vertical sectional view of a diesel particulate filter according to a third embodiment of the present invention.

FIG. 6 is a cross-sectional view of a central part in an axial direction of a diesel particulate filter according to a third embodiment. The point in which the diesel particulate filter of the present embodiment is different from that in the first embodiment is a point that the sum total S of the area of the inner face of the inlet-side flow channel 210 is relatively reduced and a hydraulic diameter HD of the inlet-side flow channel is relatively increased, and that the cell density D relatively becomes large so as to satisfy the ranges of the sum total S of the area of the inner face of the inlet-side flow channel 210, the cell density D and the hydraulic diameter HI) of the inlet-side flow channel, which have been shown in the first embodiment. In addition, the number of the salients 210a in the inlet-side flow channel 210 also decreases, and the height also relatively becomes small. Specifically, two salients 210a are formed on each of the partition wall portions 201wio, and two salients 210a are formed on each of the partition wall portions 201wii. Also in the present embodiment, an average height Hio of the salients 210a provided on the partition wall portion 201wio is higher than an average height Hii of the salients 210a provided on the partition wall portion 201wii.

Fourth Embodiment

Figure 7:
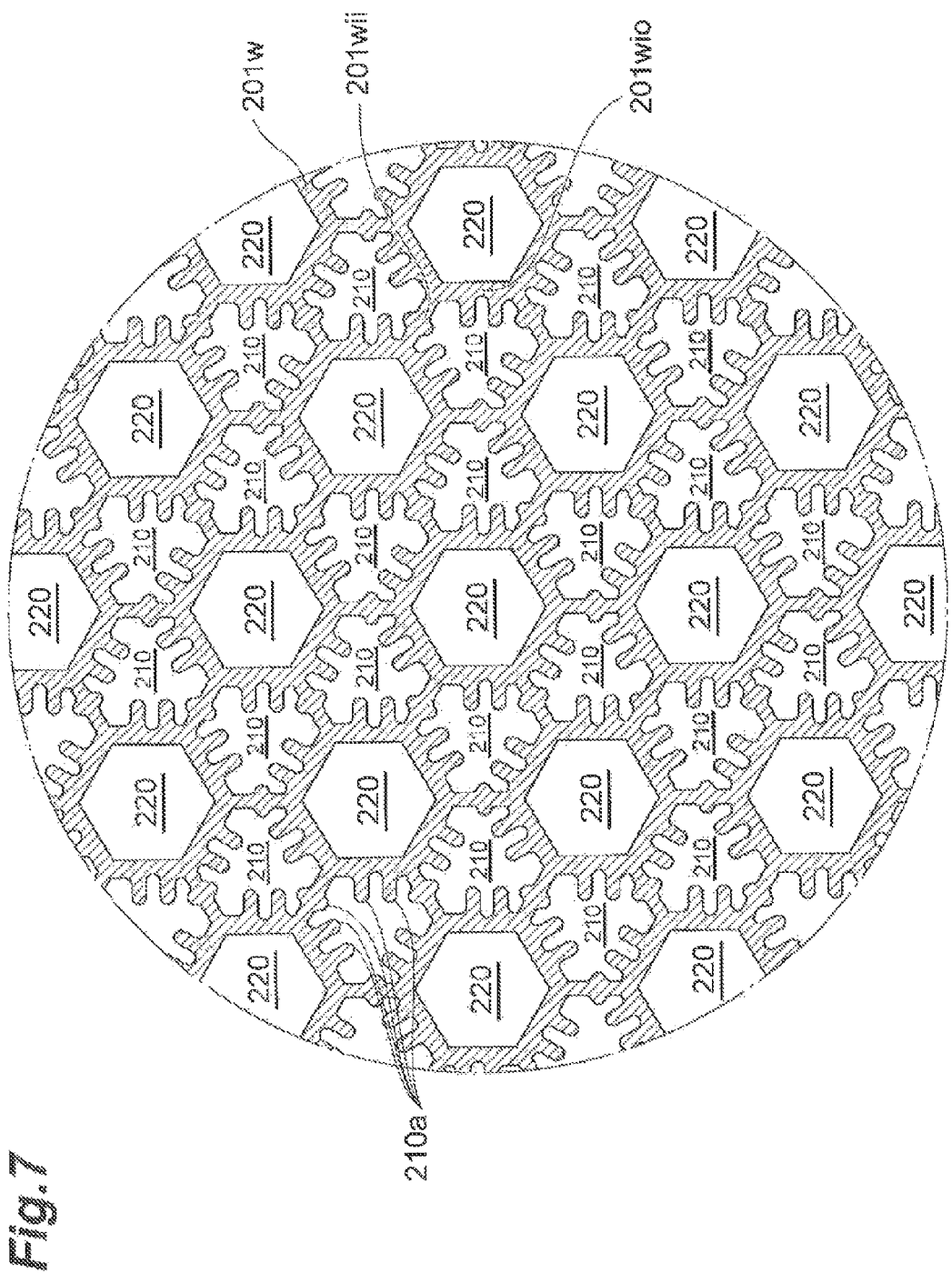
FIG. 7 is a vertical sectional view of a diesel particulate filter according to a fourth embodiment of the present invention.

FIG. 7 is a cross-sectional view of a central part in an axial direction of a diesel particulate filter according to a fourth embodiment. The point in which the diesel particulate filter of the present embodiment is different from that in the first embodiment is a point that the sum total S of the area of the inner face of the inlet-side flow channel 210 is relatively increased and a hydraulic diameter HD of the inlet-side flow channel is relatively reduced, and that the cell density D becomes relatively large so as to satisfy the ranges of the sum total S of the area of the inner face of the inlet-side flow channel 210, the cell density D and the hydraulic diameter HD of the inlet-side flow channel, which have been shown in the first embodiment. In addition, the number of the salients 210a in the inlet-side flow channel 210 also decreases. Specifically, two salients 210a are formed on each of the partition wall portions 201wio, and one salient 210a is formed on each of the partition wall portions 201wii. Also in the present embodiment, an average height Hio of the salients 210a provided on the partition wall portion 201wio is higher than an average height Hii of the salient 210a provided on the partition wall portion 201wii.

Fifth Embodiment

Figure 8:
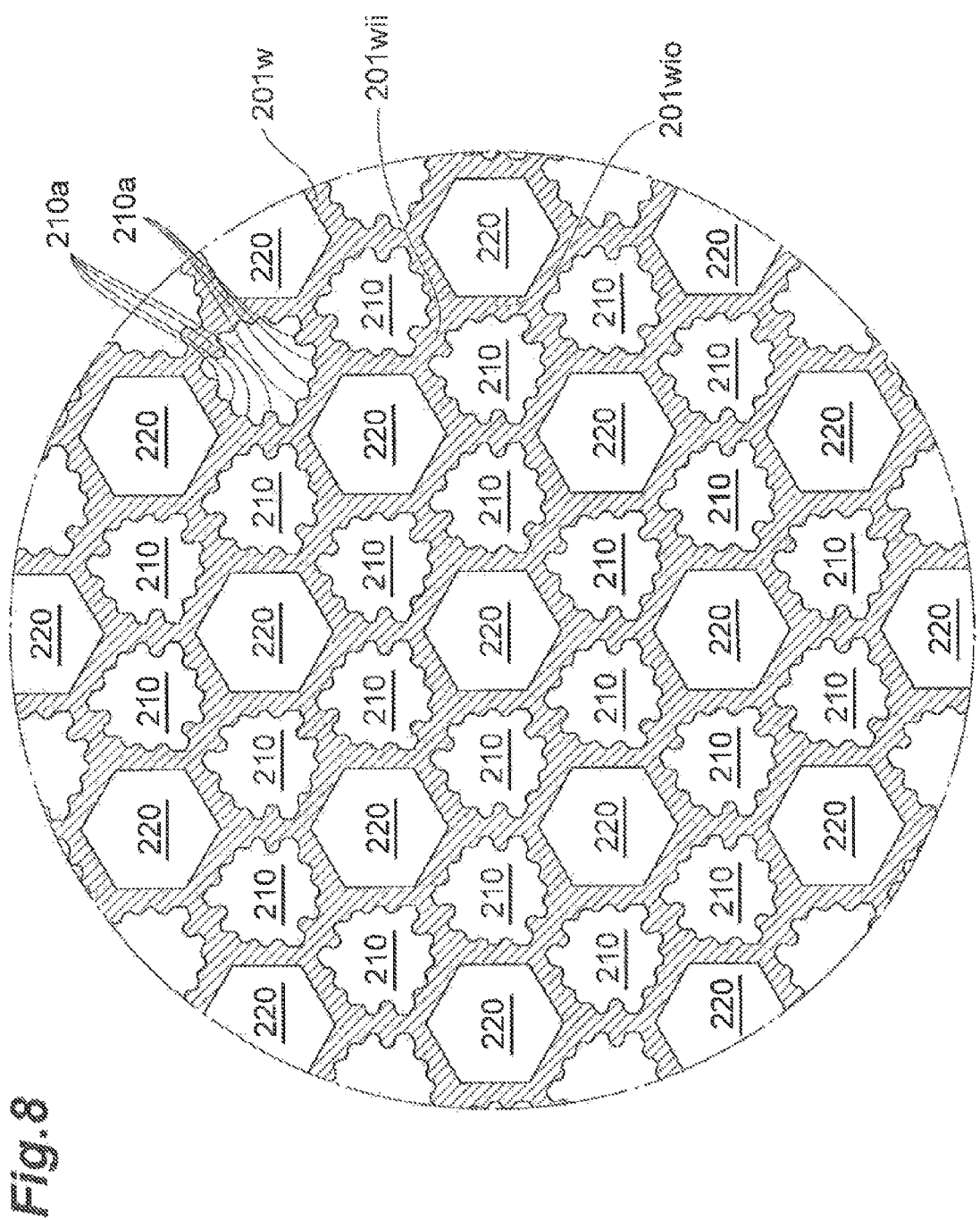
FIG. 8 is a vertical sectional view of a diesel particulate filter according to a fifth embodiment of the present invention.

FIG. 8 is a cross-sectional view of a central part in an axial direction of a diesel particulate filter according to a fifth embodiment. The point in which the diesel particulate filter of the present embodiment is different from that in the third embodiment is a point that the average height Hio of the salients 210a provided on the partition wall portion 201wio is lower than the average height Hii of the salients 210a provided on the partition wall portion 201wii.

Specifically, two salients 210a are formed on each of the partition wall portions 201wio, one salient 210a is formed on each of the partition wall portions 201wii, and one salient 210a is formed so as to stride from the partition wall portion 201wii to the partition wall portion 201wio.

Sixth Embodiment

Figure 9:
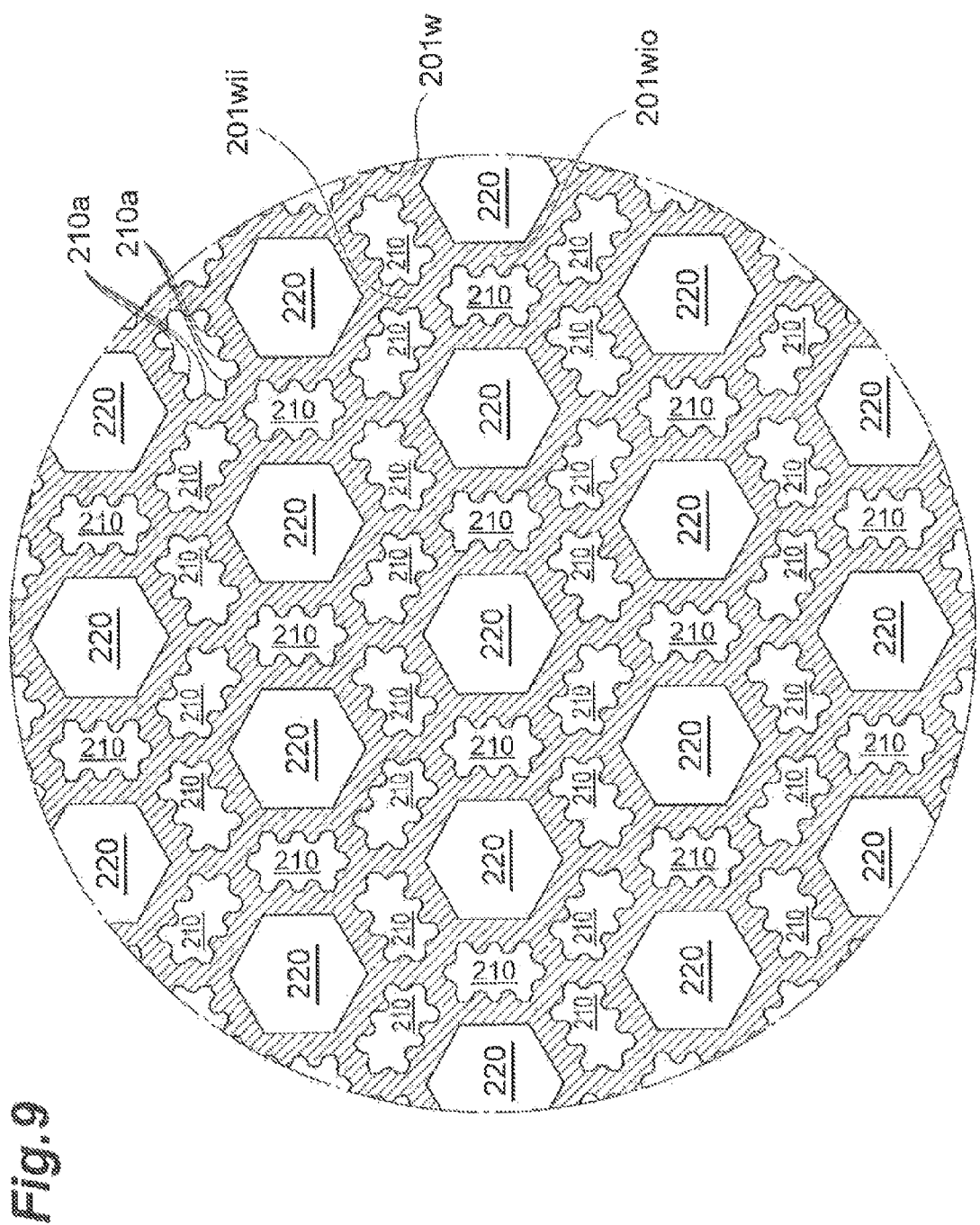
FIG. 9 is a vertical sectional view of a diesel particulate filter according to a sixth embodiment of the present invention.

FIG. 9 is a cross-sectional view of a central part in an axial direction of a diesel particulate filter according to a sixth embodiment. The point in which the diesel particulate filter of the present embodiment is different from that in the first embodiment is mainly in an arrangement of the inlet-side flow channel 210 and the outlet-side flow channel 220. In the present embodiment, adjacently to each of the outlet-side flow channels 220, six inlet-side flow channels 210 are arranged so as to sandwich the partition wall portion forming the outlet-side flow channel 220, but on the other hand, other outlet-side flow channels 220 are not arranged there. In addition, adjacently to each of the inlet-side flow channels 210, four other inlet-side flow channels 210 are arranged and also two outlet-side flow channels 220 are arranged so as to sandwich the partition wall portion forming the inlet-side flow channel 210. Other configurations are the same as those of the first embodiment.

Seventh Embodiment

Figure 10:
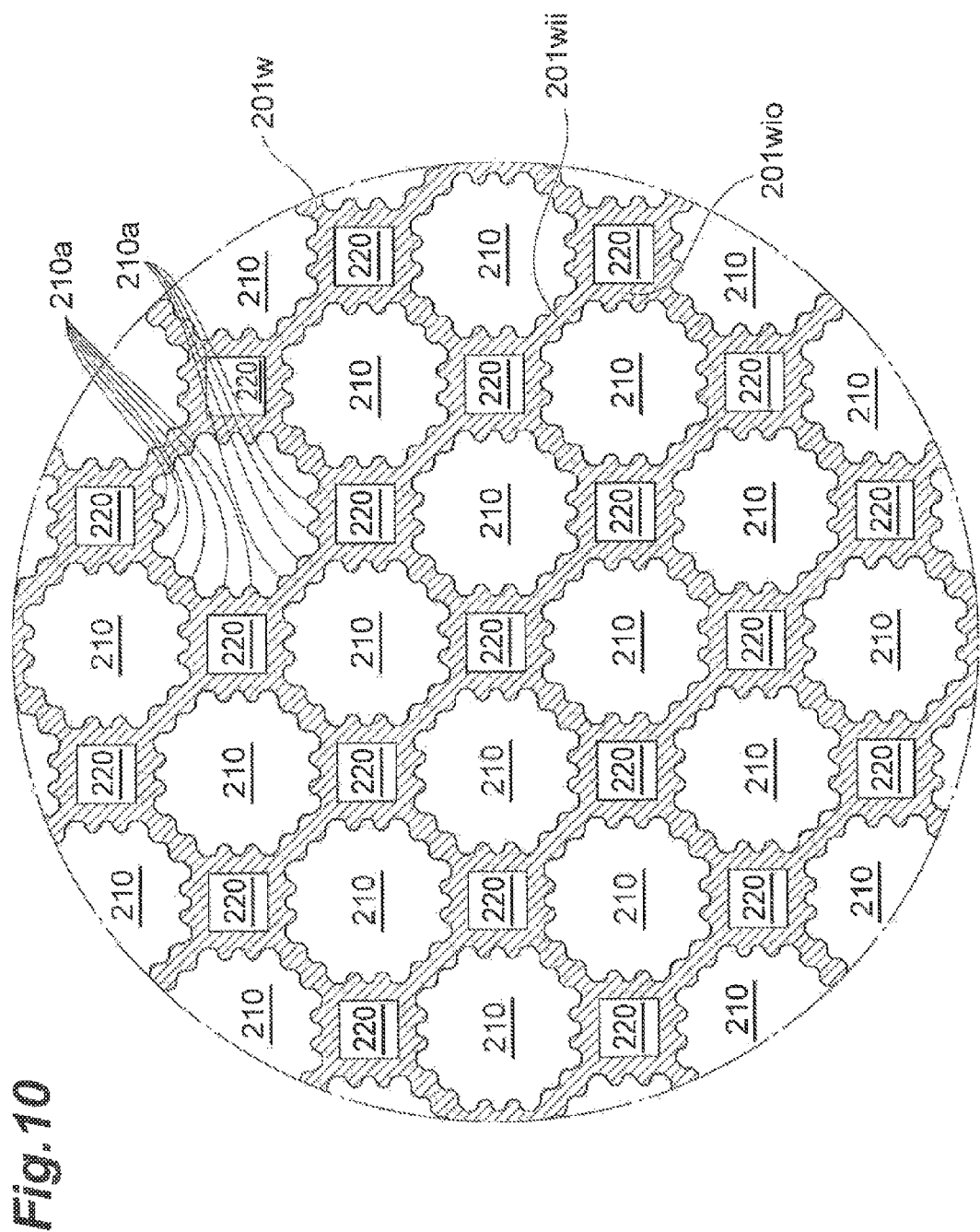
FIG. 10 is a vertical sectional view of a diesel particulate filter according to a seventh embodiment of the present invention.

FIG. 10 is a cross-sectional view of a central part in an axial direction of a diesel particulate filter according to a seventh embodiment. The point in which the diesel particulate filter of the present embodiment is different from that in the first embodiment is in the cross-sectional shapes and the arrangement of the inlet-side flow channel 210 and the outlet-side flow channel 220. In the present embodiment, the cross-sectional shape of each of the outlet-side flow channels 220 is a quadrangle. In addition, in the present embodiment, adjacently to each outlet-side flow channel 220, four inlet-side flow channels 210 are arranged so as to sandwich the partition wall portion forming the outlet-side flow channel 220, but on the other hand, other outlet-side flow channels 220 are not arranged. In addition, adjacently to each inlet-side flow channel 210, four other inlet-side flow channels 210 are arranged and also four outlet-side flow channels 220 are arranged, so as to sandwich the partition wall portion forming the inlet-side flow channel 210. Other configurations are the same as those of the first embodiment.

These diesel particulate filters can be manufactured by the steps including: (a) a raw material preparation step of preparing a mixture of raw materials containing a raw material powder of ceramics and a hole-forming agent; (b) a molding step of molding the mixture of the raw materials and obtaining a molded body having the inlet-side flow channel and the outlet-side flow channel; and (c) a firing step of firing the molded body. Incidentally, it is also acceptable to fire the molded body in which the through holes th are not closed, specifically, in which the inlet-side flow channel and the outlet-side flow channel are not formed and the through holes th are formed, and then to close the through holes th to form the inlet-side flow channel and the outlet-side flow channel.

For information, the present invention is not necessarily limited to the above described embodiments, but can be modified in various ways in such a range as not to deviate from the gist.

For instance, the cross-sectional shape and/or the arrangement of the inlet-side flow channel 210 and the outlet-side flow channel 220 in the diesel particulate filter 200 are not limited to the above described embodiments, as long as the cross-sectional shape and/or the arrangement satisfy the above described ranges of S, D and HD. For instance, the shape of the inlet-side flow channel can be set at a shape which does not have a salient, for instance, including: a simple polygon such as a quadrangle, a hexagon and an octagon; a circle; and an ellipse. In addition, even when the flow channel has a plurality of salients 210a, the shape, the height and the like thereof are not limited to the above described embodiments.

In addition, also the cross-sectional shape of the outlet-side flow channel 220 is not limited to a hexagon, but can be set at various shapes such as a quadrangle, an octagon, a circle and an ellipse.

Furthermore, the arrangement of the inlet-side flow channel 210 and the outlet-side flow channel 220 is not limited to the above described embodiments, and may be a form in which adjacently to the inlet-side flow channel, at least the outlet-side flow channel and the other inlet-side flow channel are arranged so as to sandwich the partition wall portion forming the inlet-side flow channel, and the flow channels satisfy the above described S, D and HD.

In addition, the closing method is also not limited to a form of plugging an end of the through hole with the closing portion, and may be a form of expanding diameters of the through holes around the through hole to be closed, which are not closed, and crushing the partition wall of the through hole to be closed to close the end of the through hole.

In addition, the contour shape of the filter is not limited to the cylindrical shape in particular, as long as the shape is a columnar shape, and may be a rectangular cylinder or the like, for instance.

Furthermore, the above described filter is the diesel particulate filter for collecting soot in the exhaust gas exhausted from a diesel engine, but may also be a particulate filter for collecting the soot in the exhaust gas exhausted from various internal combustion engines such as a gasoline engine.

The present invention will be described further in detail below with reference to calculation examples, but the present invention is not limited to these calculation examples.

Calculation Examples A1 to A5

For each of the diesel particulate filters shown in Table 1 and Table 2, the difference dP was determined by the calculation, which was the difference between a pressure loss at the time before the collection of the soot and a pressure loss at the time after 4 g of the soot per 1 L of a filter volume has been collected.

The Calculation Examples A1 to A5 have structures of the diesel particulate filters according to the first to fifth embodiments, respectively.

The difference dP was calculated by using a method described in "Fundamental Studies of Diesel Particulate Filters: Transient Loading, Regeneration and Ageing"), written by Konstandopoulos A. G, Kostoglou M. Skaperdas E., Papaioannou E., Zarvalis D. and Kladopoulou E., in SAE2000-01-1016, 2000. In addition, the diesel particulate filters of the Calculation Examples A1 to A5 satisfy the above described conditions S, D and HD.

Comparative Calculation Examples B1 to B4

In Comparative Calculation Examples B1 to B4, the differences between the pressure losses were calculated for the diesel particulate filters having shapes illustrated in FIGS. 11 to 14, respectively.

In the Comparative Calculation Example B1 (FIG. 11), the arrangement of the inlet-side flow channels 210 and the outlet-side flow channels 220 is the same as that in the Calculation Example A1, but the salients 210a are not formed in the inner face of the inlet-side flow channel 210.

In the Comparative Calculation Example B2 (FIG. 12), the arrangement is a so-called square arrangement, and the inlet-side flow channels 210 and the outlet-side flow channels 220 are alternately arranged in a staggered shape. In the inlet-side flow channel, a plurality of salients 210a are formed.

In the Comparative Calculation Example B3 (FIG. 13), the cross-sectional area of the inlet-side flow channel 210 is more enlarged than that in the Comparative Calculation Example B2.

In the Comparative Calculation Example B4 (FIG. 14), more salients are provided in the inlet-side flow channel 210 than those in the Comparative Calculation Example B1.

The sizes of each of the Comparative Calculation Examples are shown in Table 1 and Table 2.

TABLE 1

Figure 11:
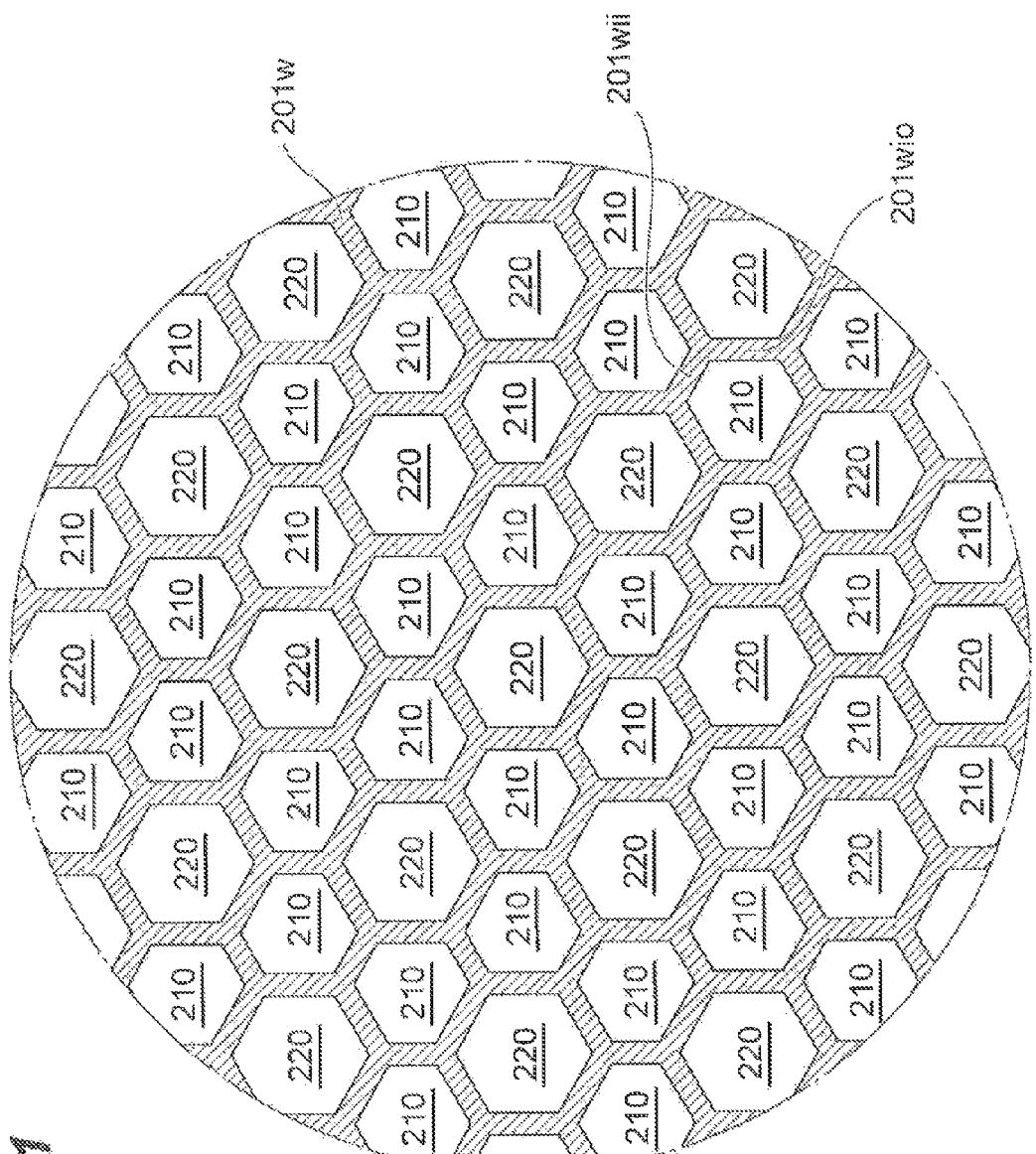
FIG. 11 is a vertical sectional view of a diesel particulate filter according to a comparative example B1.
Figure 12:
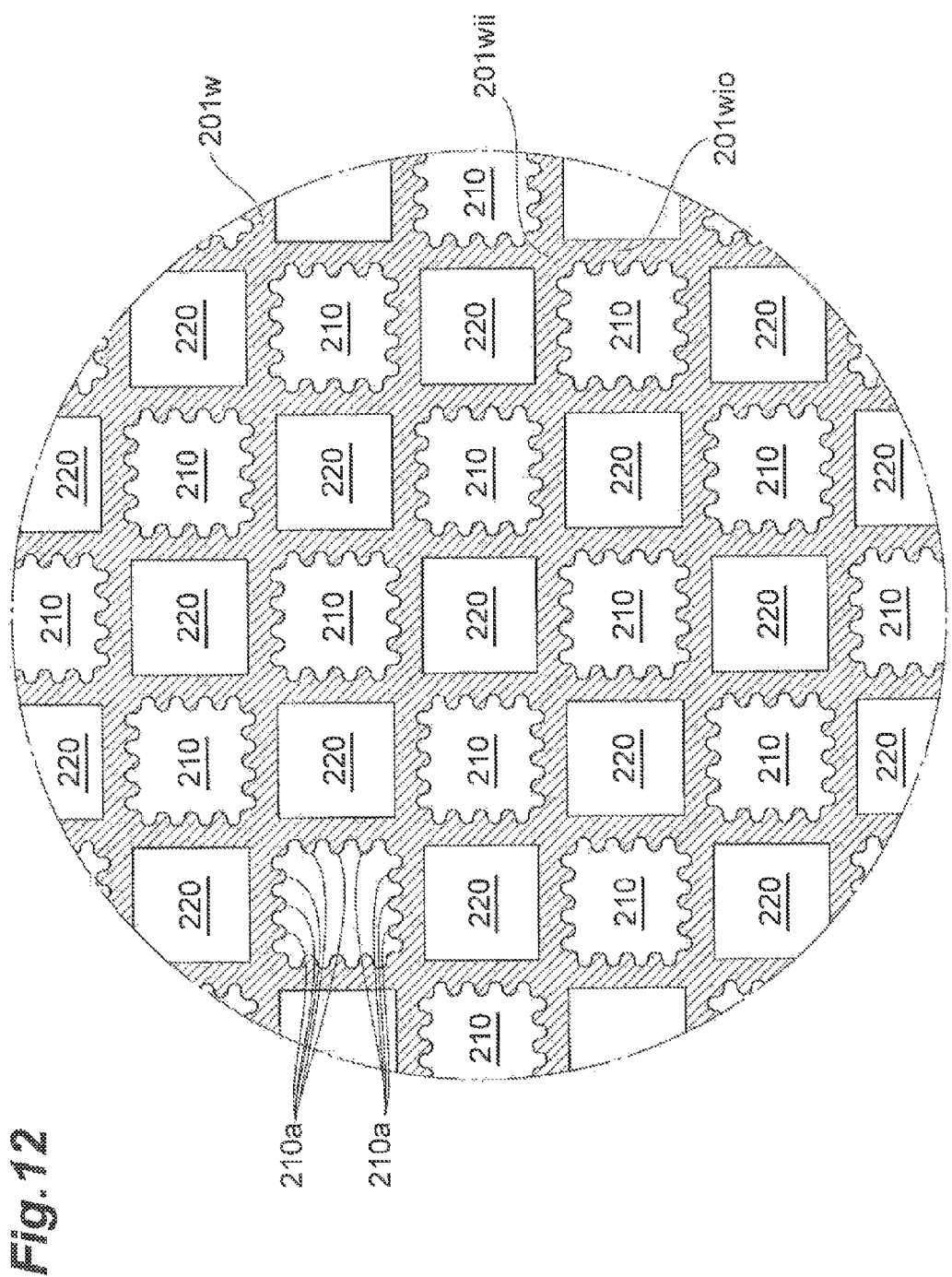
FIG. 12 is a vertical sectional view of a diesel particulate filter according to a comparative example B2.
Figure 13:
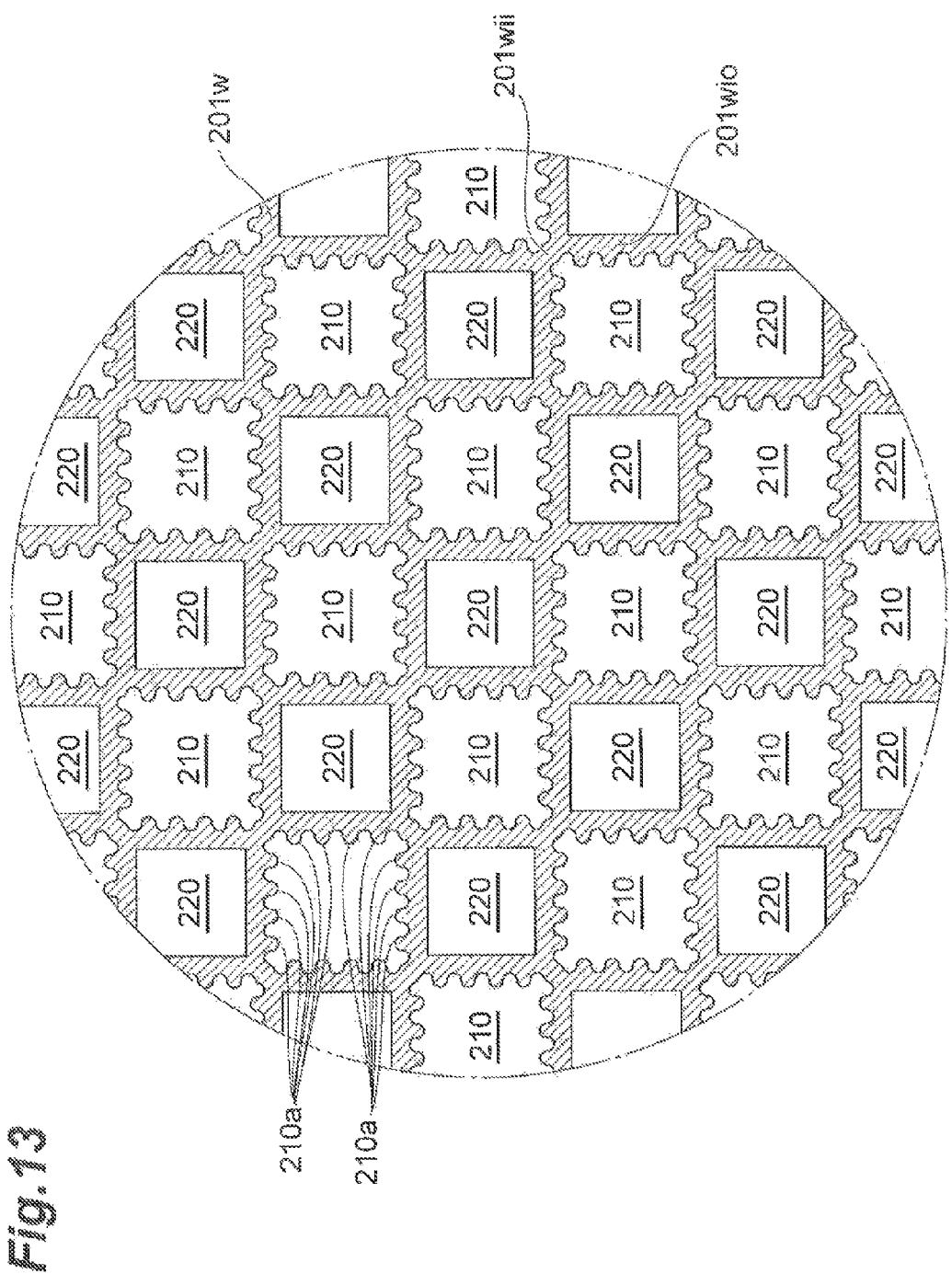
FIG. 13 is a vertical sectional view of a diesel particulate filter according to a comparative example B3.
Figure 14:
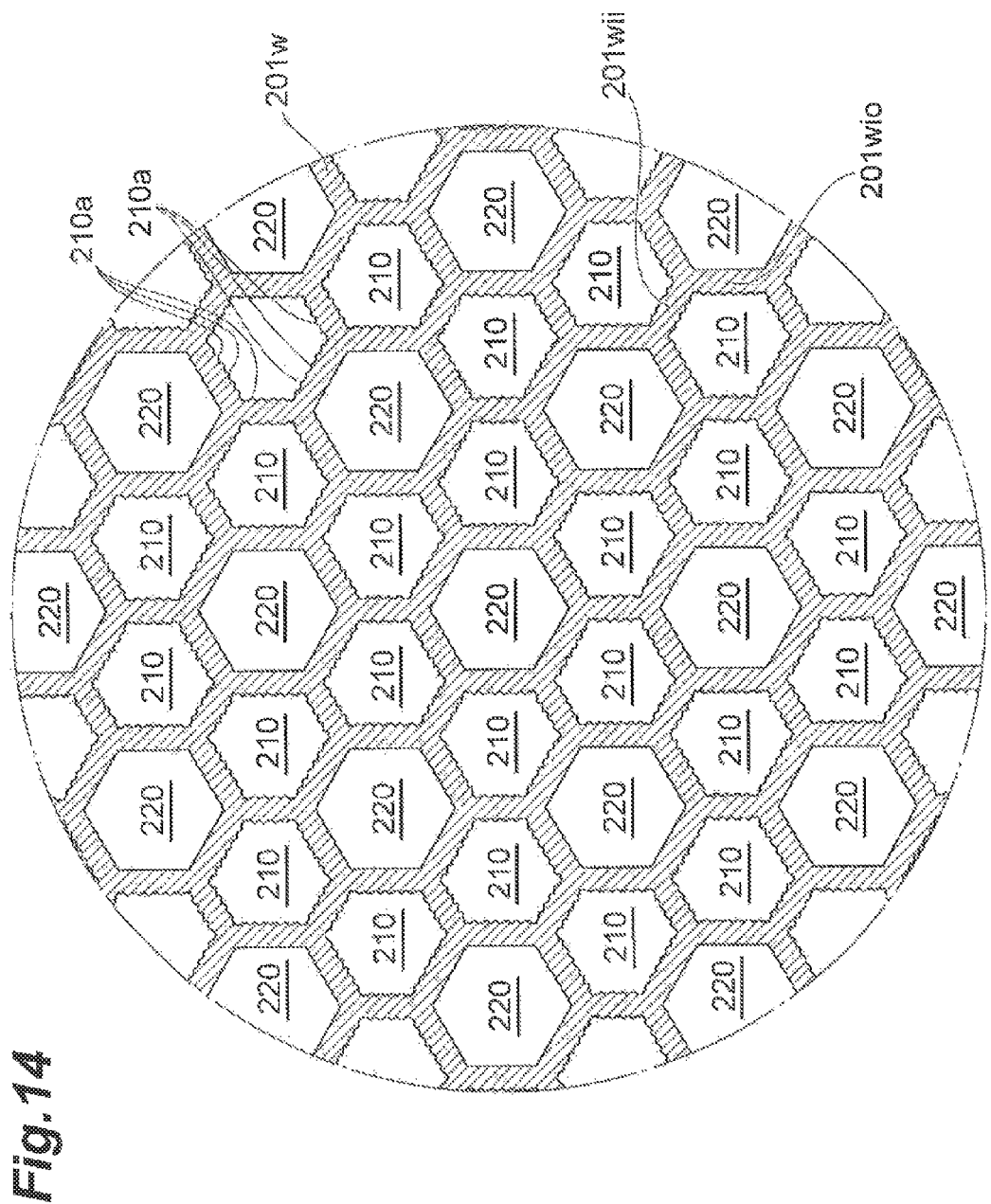
FIG. 14 is a vertical sectional view of a diesel particulate filter according to a comparative example B4.

| | Symbol | Unit | Calculation Example | | | | | Comparative Calculation Example | | | |
|---|---|---|---|---|---|---|---|---|---|---|---|
| Number | — | — | A1 | A2 | A3 | A4 | A5 | B1 | B2 | B3 | B4 |
| Structure | — | — | FIG. 1 to FIG. 4 | FIG. 5 | FIG. 6 | FIG. 7 | FIG. 8 | FIG. 11 | FIG. 12 | FIG. 13 | FIG. 14 |
| Feature | — | — | low D | high D | low S (high H) | high S (low H) | Height of salient: in-in > in-out | — | — | — | — |
| Sum total of areas of inner faces of inlet-side flow channels | S | $m^2/L$ | 2.15 | 1.65 | 1.67 | 2.44 | 1.57 | 1.20 | 1.13 | 1.33 | 1.41 |
| Cell density | D | cpsi | 151 | 347 | 281 | 281 | 281 | 330 | 150 | 150 | 281 |
| Hydraulic diameter of inlet-side flow channel | HD | mm | 0.70 | 0.82 | 0.93 | 0.56 | 0.94 | 1.17 | 1.14 | 1.24 | 1.05 |
| Sum total of cross-sectional areas of inlet-side flow channels/Sum total of cross-sectional areas of outlet-side flow channels | Rs | — | 1.36 | 1.23 | 1.44 | 1.27 | 1.38 | 1.40 | 1.00 | 1.48 | 1.38 |
| Sum total of areas of inner faces in inlet-side flow channels/sum total of areas of inner faces in outlet-side flow channels | Rw | — | 3.93 | 2.00 | 2.27 | 3.33 | 2.14 | 1.70 | 1.46 | 1.85 | 1.92 |

TABLE 1-continued

| | Symbol | Unit | Calculation Example | | | | | Comparative Calculation Example | | | |
|---|---|---|---|---|---|---|---|---|---|---|---|
| Height of salient 1 on wall between inlet-side flow channel and outlet-side flow channel | H | mm | 0.324 | 0.200 | 0.160 | 0.435 | 0.068 | — | 0.200 | 0.200 | 0.030 |
| Number of salients 1 on wall between inlet-side flow channel and outlet-side flow channel | | | 6 | 3 | 6 | 6 | 3 | — | 12 | 16 | 18 |
| Height of salient 2 on wall between inlet-side flow channel and outlet-side flow channel | H | mm | 0.600 | — | — | — | 0.100 | — | — | — | — |
| Number of salients 2 on wall between inlet-side flow channel and outlet-side flow channel | | | 3 | — | — | — | 3 | — | — | — | — |
| Average height of salients on wall between inlet-side flow channel and outlet-side flow channel | Hio | mm | 0.416 | 0.200 | 0.160 | 0.435 | 0.084 | — | 0.200 | 0.200 | 0.030 |
| Height of salient on wall between inlet-side flow channel and inlet-side flow channel | H | mm | 0.246 | 0.068 | 0.080 | 0.128 | 0.200 | — | 0.084 | 0.024 | 0.030 |
| Number of salients on wall between inlet-side flow channel and inlet-side flow channel | | | 6 | 3 | 3 | 3 | 3 | — | 4 | 4 | 12 |
| Average height of salients on wall between inlet-side flow channel and inlet-side flow channel | Hii | mm | 0.246 | 0.068 | 0.080 | 0.128 | 0.200 | — | 0.084 | 0.024 | 0.030 |
| Difference between average heights of salients | Hio-Hii | mm | 0.170 | 0.132 | 0.080 | 0.307 | −0.116 | — | 0.116 | 0.176 | 0.000 |

TABLE 2

| | Symbol | Unit | Calculation Example | | | | | Comparative Calculation Example | | | |
|---|---|---|---|---|---|---|---|---|---|---|---|
| Number | — | — | A1 | A2 | A3 | A4 | A5 | B1 | B2 | B3 | B4 |
| Distance between recess and salient on wall between inlet-side flow channel and outlet-side flow channel | F | mm | 0.200 | 0.181 to 0.200 | 0.196 | 0.200 | 0.121 to 0.173 | — | 0.200 | 0.200 | 0.071 |

TABLE 2-continued

| | Symbol | Unit | Calculation Example | | | | | Comparative Calculation Example | | | |
|---|---|---|---|---|---|---|---|---|---|---|---|
| Distance between recess and salient on nail between inlet-side flow channel and inlet-side flow channel | F | mm | 0.200 | 0.150 | 0.160 | 0.186 | 0.194 to 0.200 | — | 0.163 | 0.096 | 0.071 |
| Minimum thickness of wall between inlet-side flow channel and inlet-side flow channel | | mm | 0.246 | 0.260 | 0.260 | 0.200 | 0.260 | 0.330 | — | — | 0.300 |
| Minimum thickness of wall between inlet-side flow channel and outlet-side flow channel | | mm | 0.260 | 0.260 | 0.260 | 0.205 | 0.260 | 0.330 | 0.310 | 0.260 | 0.315 |
| Distance between centers of inlet-side flow channel and outlet-side flow channel | Lio | mm | 2.49 | 1.65 | 1.83 | 1.83 | 1.83 | 1.83 | 2.07 | 2.07 | 1.83 |
| Distance between sides of outlet-side flow channel | Loo | mm | 2.29 | 1.52 | 1.68 | 1.68 | 1.68 | 1.66 | 1.66 | 1.55 | 1.66 |
| Difference between pressure losses at the times before and after collection of 4 g of soot | dP | kPa | 3.69 | 4.97 | 4.86 | 2.76 | 5.44 | 6.63 | 9.60 | 7.25 | 6.54 |

In addition, the calculation result is shown in Table 2, which shows the pressure losses at the times before and after the collection of 4 g of the soot per 1 L of a filter volume. It was confirmed that the increase between the pressure losses at the times before and after the collection of the soot was low in the diesel particulate filters of the Calculation Examples A1 to A5.

REFERENCE SIGNS LIST

200 . . . diesel particulate filter (filter), 201in . . . inlet-side end face (one end face), 201out . . . outlet-side end face (the other end face), 201 . . . ceramic honeycomb structure, 201w . . . porous ceramic partition wall, 201p . . . closing portion, 210 . . . inlet-side flow channel (first flow channel), 210a . . . salient, and 220 . . . outlet-side flow channel (second flow channel).

The invention claimed is:

1. A particulate filter having a columnar ceramic honeycomb structure comprising a plurality of first flow channels and a plurality of second flow channels, wherein
the plurality of first flow channels extend in an axial direction of the ceramic honeycomb structure, are each opened in one end face, and are each closed in the other end face;
the plurality of second flow channels extend in the axial direction of the ceramic honeycomb structure, are each opened in the other end face, and are each closed in the one end face;
adjacently to each of the first flow channels, the second flow channel and the other first flow channel, are arranged so as to sandwich a partition wall portion forming each of the first flow channels;
a sum total of areas of inner faces of the plurality of first flow channels in the total volume of the ceramic honeycomb structure is 1.5 to 2.5 $m^2/L$;
a number density of a total of the plurality of first flow channels and the plurality of second flow channels is 150 to 350 per unit square inch in a cross section perpendicular to an axis of the ceramic honeycomb structure;
a hydraulic diameter of each of the plurality of first flow channels is 0.5 to 1.0 mm;
wherein the inner face of at least one of the first flow channels has a plurality of salients extending in the axial direction of the ceramic honeycomb structure; and
wherein in at least one of the first flow channels, an average height of salients provided on a partition wall portion separating the first flow channel and the second flow channel from each other is larger than an average height of salients provided on a partition wall portion separating the first flow channel and the first flow channel from each other.

2. The particulate filter according to claim 1, wherein when Rw is defined by (sum total of areas of inner faces in the plurality of first flow channels/sum total of areas of inner faces in the plurality of second flow channels), $2 \leq Rw \leq 4$ is satisfied.

3. The particulate filter according to claim 1, wherein when Rs is defined by (sum total of sectional areas of the plurality of first flow channels/sum total of sectional areas of the plurality of second flow channels), $1.1 \leq Rs \leq 2.0$ is satisfied.

4. The particulate filter according to claim 1, wherein
adjacently to each of the first flow channels, three of the second flow channels and other three of the first flow channels are arranged so as to sandwich the partition wall portion forming each of the first flow channels; and
adjacently to each of the second flow channels, six of the first flow channels are arranged so as to sandwich a partition wall portion forming each of the second flow channels.

5. The particulate filter according to claim 1, wherein
adjacently to each of the first flow channels, two of the second flow channels and other four of the first flow channels are arranged so as to sandwich the partition wall portion forming each of the first flow channels; and
adjacently to each of the second flow channels, six of the first flow channels are arranged so as to sandwich a partition wall portion forming each of the second flow channels.

6. The particulate filter according to claim 1, wherein
adjacently to each of the first flow channels, four of the second flow channels and other four of the first flow channels are arranged so as to sandwich the partition wall portion forming each of the first flow channels; and
adjacently to each of the second flow channels, four of the first flow channels are arranged so as to sandwich a partition wall portion forming each of the second flow channels.

\* \* \* \* \*